(No Model.) 2 Sheets—Sheet 1.
J. MURREY.
BRAKE MECHANISM FOR CARS.
No. 486,384. Patented Nov. 15, 1892.
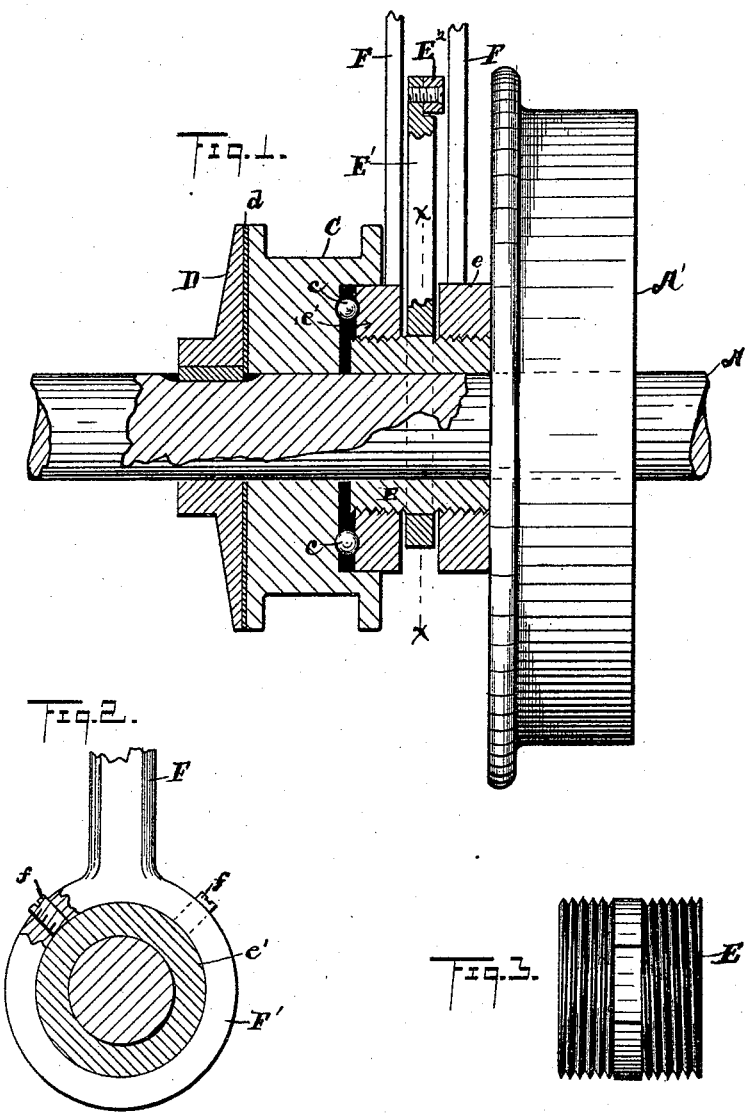
WITNESSES
Belle S. Lowrie
Geo. W. King
INVENTOR.
Jasper Murrey
By Geo. W. King.
ATTORNEY.

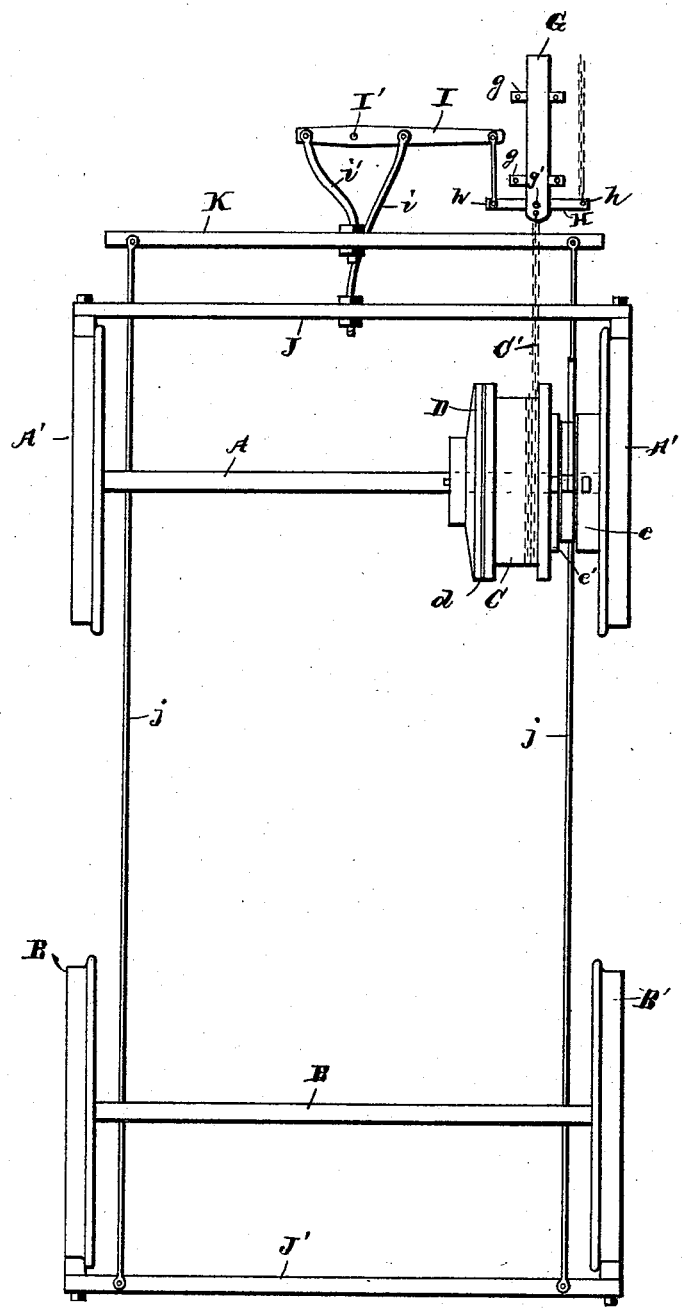

UNITED STATES PATENT OFFICE.

JASPER MURREY, OF CLEVELAND, OHIO, ASSIGNOR OF ONE-HALF TO SAMUEL HARRIS, OF SAME PLACE.

BRAKE MECHANISM FOR CARS.

SPECIFICATION forming part of Letters Patent No. 486,384, dated November 15, 1892.

Application filed June 30, 1892. Serial No. 438,512. (No model.)

*To all whom it may concern:*

Be it known that I, JASPER MURREY, of Cleveland, in the county of Cuyahoga and State of Ohio, have invented certain new and useful Improvements in Brake Mechanism for Cars; and I do hereby declare the following to be a full, clear, and exact description of the invention, such as will enable others skilled in the art to which it pertains to make and use the same.

My invention relates to car-brake mechanism; and it consists in certain features of construction and combinations of parts hereinafter described, and pointed out in the claims.

In the accompanying drawings, Figure 1 is an elevation, partly in section, of mechanism embodying my invention. Fig. 2 is an elevation in section on line $x\,x$, Fig. 1, showing more especially the manner of attaching a lever to one of the nuts to hold the latter from turning on its axis. Fig. 3 is a plan in detail of the right and left handed screw-threaded sleeve. Fig. 4 is a diagrammatic plan of the general features of the brake mechanism.

The brake mechanism herewith illustrated is of the variety having a drum rotated by friction, the friction being applied by means of a hand-lever, and the drum having attached a chain for winding thereon, such chain connecting with and being adapted to operate the lever system that operates the brakes.

A and B are car-axles bearing, respectively, the car-wheels A' and B'. On axle A is mounted loosely the drum C, the drum having attached a chain C', adapted to wind on the drum. On the inner side of the drum is located the friction-disk D, the latter being rigidly mounted on axles A; but there is preferably a thin disk $d$, of leather or other suitable material, located between members C and D for receiving the wear and for increasing and rendering more uniform the frictional power derived from forced contact of these members. Between the drum and the adjacent car-wheel is located a sleeve E, this sleeve being mounted loosely on the car-axle. The sleeve at the center is preferably polygonal, and the attached lever E' has a corresponding head shrunk on, by means of which the sleeve may be oscillated on its axis, and the free end of the lever E' is operatively connected with the ordinary hand-lever (not shown) that is supposed to be located on the forward platform of the car, the connection between the hand-lever and lever E' being usually by means of a rod or link, as at $E^2$.

The end sections of sleeve E are screw-threaded externally and respectively right and left handed, (see Fig. 3,) and on these screw-threaded sections are mounted nuts $e$ $e'$. These nuts, (externally,) are preferably cylindrical, each nut bearing a lever F. The free end of each lever F is operatively connected by rod, link, or other means with, for instance, the motor-frame or with the car-body to prevent the nut from turning on its axis. The two levers F are usually constructed substantially as shown in Fig. 2, the fixed end of the lever terminating in a head F', bored to fit easily over a nut $e$ or $e'$, as the case may be, set-screws $f$ being provided for rigidly fastening the lever to the nut on which it is mounted. When the parts are assembled and adjusted, nut $e$ is adapted to bear against the hub of the adjacent car-wheel, or, if this hub is not of sufficient diameter for the purpose, a stiff metal plate may be interposed between the nut and wheel-hub. Nut $e'$ and drum C are provided with corresponding annular grooves to accommodate a series of balls $c$, thereby constituting an antifriction or ball bearing between members C and $e'$.

With the construction shown it is evident that when the operator turns sleeve E in the one direction nuts $e$ $e'$ will be moved toward each other, and by reversing the sleeve the nuts are further separated, by means of which the drum C is forced against the friction-disk, so as to be rotated by the latter. When sleeve E is again reversed to draw the nuts toward each other, the frictional parts separate or become inoperative.

To adjust the parts primarily and in taking up the wear, first the free end of the lever F of nut $e'$ is unfastened and then the lever is used to turn the nut, for instance, toward drum E, and when the nut shall have been properly adjusted endwise set-screws $f$ are loosened and this lever is reset, after which its set-screws are again tightened. It would seem appropriate in this connection to mention some of the marked advantages accruing from the construction shown as compared with preceding devices of this class. First, it will be noticed that no extra shaft and hangers are required, the chain-drum and the friction devices for operating it being mounted on the car-axle, a member well adapted to withstand the lateral strain, and also the simple and compact nature of the device may be noted and the facilities for taking up lost motion caused by the wear of the parts. Chain C' leads to and connects with bar G, this bar being secured by housings or boxes $g$ to the under side of the car-frame, so that the bar may reciprocate endwise. To bar G is pivoted at $g'$ a lateral lever H, so that the lever is carried by the bar. On opposite sides and equidistant from the fulcrum thereof are attached to lever H link $h$ and chain $h'$, the latter leading to the trail-car, where it connects with a similar lever system for operating the brakes on the rear car. Lever H might properly be called an equalizing-lever, because it distributes the power equally to the brakes of the two cars. Link $h$ connects with the one extreme of lever I, the latter being fulcrumed at I' to the car-body or to an attachment of the latter. On opposite sides and equidistant from the fulcrum thereof are pivoted to lever I rods $i$ and $i'$, the former connecting directly with the brake-beam J, whereby in operating lever I the brake-beam is moved toward and from the adjacent car-wheels, whereby the brakes are "set" or moved "off" by reverse movements of lever I. Rod $i'$ connects with a latteral bar K, and the extremes of the latter are connected by rods $j$ with brake-beam J', located at the other end of the car, so that the same movement of lever I sets or moves off both set of brakes of a car.

I may remark that about all of the ordinary brake-beams are provided with springs for backing the brakes, so that if chains in place of rods are used for connecting the levers the recoil of such springs would reverse the lever system when the friction-clutch is opened or released.

The antifriction or ball bearing performs an important function, to wit: Were it not for this ball-bearing the friction between nut $e'$ and the drum would of course tend to hinder the drum from rotating, and would thereby tend to counteract the frictional force generated between the drum and friction-disk. Hence the importance of this ball-bearing between the drum and engaging nut.

What I claim is—

1. In brake mechanism for street-cars, in combination, a car-axle and a friction disk, drum, and sleeve mounted on the axle in the order named, the sleeve being screw-threaded right and left handed and bearing nuts expansible by rotating the sleeve, such expansion of the nuts being adapted to close the clutch, substantially as and for the purpose set forth.

2. In brake mechanism, in combination, a car-axle, friction disk and drum, and a sleeve mounted on the axle, the sleeve bearing right and left handed nuts, the drum and opposing nut having a ball-bearing between them, substantially as described.

3. In brake mechanism, in combination, a car-axle, co-operating friction disk and drum and sleeve mounted on the axle, the sleeve bearing distensible nuts for operating the clutch, and means for oscillating the sleeve for distending or contracting the nuts, the drum having a chain for operating the lever system of the brakes.

4. In brake mechanism, in combination, a car-axle and friction-drum mounted thereon, and means, substantially as indicated, for operating the drum, and a chain connecting the drum with a sliding bar, such bar bearing an equalizing-lever, the two ends of the lever being operatively connected with the lever system of different cars, whereby the brakes of the different cars are simultaneously operated.

In testimony whereof I sign this specification, in the presence of two witnesses, this 23d day of June, 1892.

JASPER MURREY.

Witnesses:
J. T. MORTON,
T. J. CARMACK.